US012761176B2

(12) United States Patent
Niemann et al.

(10) Patent No.: US 12,761,176 B2
(45) Date of Patent: Oct. 13, 2026

(54) METHOD AND SENSOR ASSEMBLY FOR DETECTING AEROSOLS IN THE AMBIENT AIR OF A MOTOR VEHICLE

(71) Applicant: HELLA GmbH & Co. KGaA, Lippstadt (DE)

(72) Inventors: Thomas Niemann, Delmenhorst (DE); Bastian Kanning, Bremen (DE); Christian Sasse, Verden/Aller (DE)

(73) Assignee: HELLA GMBH & CO. KGAA, Lippstadt (DE)

( * ) Notice: Subject to any disclaimer, the term of this patent is extended or adjusted under 35 U.S.C. 154(b) by 325 days.

(21) Appl. No.: 18/434,206

(22) Filed: Feb. 6, 2024

(65) Prior Publication Data

US 2024/0264064 A1 Aug. 8, 2024

(30) Foreign Application Priority Data

Feb. 6, 2023 (DE) ......................... 102023102830.8

(51) Int. Cl.
*G01N 1/22* (2006.01)
*G01N 27/22* (2006.01)

(52) U.S. Cl.
CPC .................................. *G01N 27/223* (2013.01)

(58) Field of Classification Search
CPC .............. G01N 27/223; G01S 7/00–64; G01S 17/00–95; B60S 1/0822–087
See application file for complete search history.

(56) References Cited

U.S. PATENT DOCUMENTS

| | | | | |
|---|---|---|---|---|
| 6,617,564 | B2 * | 9/2003 | Ockerse | H04N 23/811 250/227.25 |
| 7,115,850 | B2 * | 10/2006 | Niemann | H05K 1/0284 250/208.2 |
| 7,838,836 | B2 * | 11/2010 | Robert | B60Q 1/0023 250/341.7 |
| 11,662,445 | B2 * | 5/2023 | Abari | G01S 7/497 356/5.01 |

FOREIGN PATENT DOCUMENTS

| | | | |
|---|---|---|---|
| DE | 102007035905 | A1 | 2/2009 |
| DE | 102010048100 | A1 | 4/2012 |
| DE | 102011017649 | B3 | 10/2012 |
| DE | 102014004451 | A1 | 10/2015 |
| DE | 102015112103 | A1 | 1/2017 |

* cited by examiner

*Primary Examiner* — Justin N Olamit
(74) *Attorney, Agent, or Firm* — MUNCY, GEISSLER, OLDS & LOWE, P.C.

(57) ABSTRACT

The invention relates to a method and a sensor device for detecting aerosols in the ambient air of a motor vehicle, wherein the probability of occurrence of aerosols in the ambient air of the vehicle is determined, wherein a control signal is sent to at least one radiation emitter when the determined probability of occurrence exceeds a defined probability value, wherein a radiation signal is emitted by the radiation emitter, wherein a possible response signal to the emitted radiation signal is captured by at least one radiation receiver, wherein the response signal is detected from at least two directions, wherein the electrical capacitance of a field around the vehicle is captured by at least one capacitive sensor, wherein the occurrence of aerosols is deduced upon detection of the response signal from two directions and detection of a change of capacitance in the surrounding area.

10 Claims, 1 Drawing Sheet

METHOD AND SENSOR ASSEMBLY FOR DETECTING AEROSOLS IN THE AMBIENT AIR OF A MOTOR VEHICLE

BACKGROUND OF THE INVENTION

The invention relates to a method for detecting aerosols in the ambient air of a motor vehicle. The invention further relates to a sensor assembly for detecting aerosols in the ambient air of a motor vehicle.

Aerosols, that is to say fine particles in the air such as fine water droplets, in the form of mist or dust, can lead to visibility limitations in the area around a motor vehicle. If the aerosol concentration is high enough, the visibility limitations can be so pronounced that the driver of the vehicle either can no longer see far enough out of the vehicle, or that the vehicle is less visible to other road users, and it therefore becomes necessary to switch on the vehicle's lights. Particularly in the case of autonomous vehicles, the disadvantage exists that without an automated estimation of the prevailing visibility range, the driving speed cannot be adapted to the visibility range, and a limitation of optical systems, such as camera systems or LIDAR systems for example, is not recognised.

An automatic mist detection system is known from DE 10 2010 048 100 A1 for example. This document contains a description of how the area surrounding the vehicle is captured by means of an image acquisition unit, wherein the mist in the area surrounding the vehicle is detected on the basis of an analysis of images from the image acquisition unit.

The drawback with this prior art is that it is a purely optical system, which is thus prone to malfunction and error.

SUMMARY OF THE INVENTION

The problem addressed by the invention is that of suggesting a method and a sensor assembly for detecting aerosols in the ambient air of a motor vehicle, in which the plausibility of measurement results is verified by a further measuring method.

To this end, in a method for detecting aerosols in the ambient air of a motor vehicle, it is provided as essential to the invention that the probability of occurrence of aerosols in the ambient air of the vehicle is determined, wherein a control signal is sent to at least one radiation emitter when the determined probability of occurrence exceeds a defined probability value, wherein a radiation signal is emitted by the radiation emitter, wherein a possible response signal to the emitted radiation signal is captured by at least one radiation receiver, wherein the response signal is detected from at least two directions, wherein the electrical capacitance of a field around the vehicle is captured by at least one capacitive sensor, wherein the occurrence of aerosols is deduced upon detection of the response signal from two directions and detection of a change of capacitance in the surrounding area.

Aerosols in the ambient air may be either finely distributed drops of liquid in the form of mist or particles such as dust particles, for example. Depending on their concentration, the aerosols may be instrumental in limiting visibility for the driver, or even of the assistance systems such as, for example, a LIDAR or camera system. In particular, the range of visibility for the driver or the assistance systems may be reduced. First, the probability of occurrence is calculated or determined, that is to say the likelihood that mist or other aerosols may form in the air under the current ambient conditions of the vehicle. For this, for example environmental information such as the outside temperature, the current humidity in the ambient air, the intensity of the current precipitation or other weather data may be used. In this context, the environmental information may be captured by sensor systems installed in the vehicle itself, for example, or also by means of information services over the internet or the like, for example. For this purpose, known calculation models may be used, from which the outside temperature at which moisture can become mist is known. Above a defined probability of the occurrence of aerosols, particularly of mist in the ambient air, a control signal is sent by a control unit for example to a radiation emitter, in particular to at least one headlamp of the vehicle. The control unit may be the vehicle's headlamp controller. In particular, a threshold value may be defined for the probability of occurrence, and the radiation signal may be emitted when this value is exceeded. The radiation signal may be a light signal. A possible response signal to the emitted radiation signal is detected by means of at least one radiation receiver, for example a photodiode or the like. In particular, the emitted radiation signal may be reflected and/or scattered by aerosols in the surrounding area, so that the reflected or scattered radiation signal is received again by the radiation receiver as a response signal. The radiation receiver may be the photodiodes of a rain-light sensor, for example, which is intended to capture the ambient brightness around the vehicle. In this context, the response signal is detected from at least two directions. In order to prevent a radiation signal which is only emitted forwards, that is to say in the vehicle's direction of travel, from merely being reflected by a vehicle travelling ahead, for example, and not by aerosols in the environment, and the response signal from being interpreted incorrectly as reflected by aerosol, the response signal is captured in a path straight ahead and in a path directed upwards. If the radiation signal is only directed forwards, it may be reflected by a vehicle travelling ahead of the motor vehicle. But if a component of the response signal also reaches the radiation receiver from above, this is most probably caused by a reflection and/or scattering from aerosols, since such aerosols completely surround the vehicle and are not only located directly in the direction of travel. In order to verify the plausibility of this result obtained from optical measuring methods, an area around the vehicle is monitored by means of a capacitive sensor. In particular, the electrical capacitance of the surrounding area is captured. The electrical capacitance of the ambient air is determined by whether the air is dry, for example, clean air that is not charged with aerosols air or air charged with dust or moisture particles. A simultaneous change in the electrical capacitance of the surrounding area with simultaneous capture of response signals from two directions suggests the presence of aerosols in the environment. Through the parallel use of the optical measuring method and the capacitive measuring method it is possible to verify the plausibility and thus reliably detect the presence of aerosols in the area surrounding the vehicle.

In a further development of the invention, at least one item of ambient information is included in the determination of the probability of occurrence, and at least one item of ambient information is the outside temperature and/or the air humidity and/or the presence of rain. The probability of the occurrence of aerosols in the ambient air, in particular the probability of the occurrence of mist, is highly dependent on environmental parameters, such as weather conditions such as the outside temperature and air humidity. These may be obtained via the vehicle's own sensor system, or also from information from an information service, for example an internet service. The occurrence of rain in the area surrounding the vehicle also influences the probability of occurrence. The probability of occurrence may be obtained for example on the basis of computer models and/or from stored reference values or the like.

In a further development of the invention, the emitted radiation signal is a unique detection signal with defined signal characteristics. For example, the radiation signal may include in particular a light signal, a certain spectrum and/or a certain frequency response and/or a certain modulation and/or the like. The radiation signal may also be emitted by pulsed radiation signals, for example. Through the defined signal characteristics, it is possible to determine precisely whether a captured response signal is a reflection signal and/or a scatter signal of the emitted radiation signal.

In a further development of the method, after the detection signal is emitted, the signals captured by the at least one radiation receiver are examined for the signal characteristics of the possible response signal by at least one evaluation unit. After the emission of the detection signal, that is to say the emitted radiation signal, the scatter signal and/or reflection signal captured by the radiation receiver are examined. For this purpose, an evaluation unit is used, which may be a calculation unit or even the vehicle's on-board computer. The captured radiation signals are evaluated to determine whether the defined signal characteristics are contained in a response signal. In this way, it is ensured that the response signal received is in fact the response signal to the detection signal.

In a further development of the invention, an electrical field is generated in the area surrounding the vehicle by the capacitive sensor, and changes in the electrical field are captured. An electrical field is generated and monitored by the capacitive sensor in the area adjacent to the sensor. The electrical field generated is thus projected into the ambient air of the vehicle. The properties of this field vary with the composition of the air, with the result that for example the electrical field in the case of dry, clean air has a different electrical capacitance than in the case of in which water is dissolved or which contains dust particles. The sensor thus measures the changes, and an evaluation device connected to the sensor may be used to evaluate the degree of contaminants in the air. In particular, the nature of the aerosol, that is to say whether it consists of dust or moisture, may also be determined on the basis of the change in the electrical capacitance of the electrical field.

In a further development of the method, a conclusion is drawn about the state of the ambient air from the measurement values capture by the capacitive sensor. The electrical capacitance of the ambient air captured by the capacitive sensor changes according to the composition thereof. The occurrence of mist or dust particles for example may be deduced from the measurement values by the use of reference values, for example.

In a further development of the method, a conclusion is drawn regarding possible limitation of visibility in the area surrounding the vehicle from the measurement values captured by the radiation receiver and the capacitive sensor. If a response signal to the emitted detection signal is received from several directions by the radiation receiver and at the same time a change in the electrical field is detected and/or measurement values consistent with the presence of aerosols are detected by means of the capacitive sensor, a visibility limitation in the area surrounding the vehicle may be inferred. The higher the concentration of aerosols is in the ambient air, the greater the visibility limitation is likely to be. If the evaluation of the measurement results by the evaluation device indicates a possible visual obstruction, an information signal may be output to the driver, and/or further assistance systems are engaged correspondingly. In an autonomous vehicle, appropriate sensor systems may be engaged, and for example the travel speed may be adjusted or the lighting controlled.

In one embodiment of the invention, at least one radiation emitter is at least one headlamp of the vehicle. For example, a headlamp or also several of the vehicle's headlamps may be used as radiation emitters by actuating the headlamp correspondingly in particular, the headlamp may be actuated in such manner as to emit a uniquely identifiable light signal as detection signal.

A further aspect of the invention relates to a sensor assembly for capturing aerosols in the ambient air of a motor vehicle with at least one radiation emitter for emitting a radiation signal, with at least one radiation receiver for capturing a possible response signal of the emitted radiation signal, with at least one capacitive sensor for capturing the electrical capacitance of a field surrounding the vehicle, and with at least one evaluation device for evaluating the measurement values captured by means of the radiation receiver and the capacitive sensor.

Aerosols in the ambient air may either be finely distributed moisture droplets in the form of mist, or particles such as dust particles. The sensor assembly includes at least one radiation emitter for emitting a radiation signal. The radiation signal may be a light signal. A possible response signal to the emitted radiation signal is captured by means of at least one radiation receiver, for example a photodiode or the like. In particular, the emitted radiation signal may be reflected or scattered by aerosols in the surrounding atmosphere, so that the corresponding response signal is received by the radiation receiver again. The radiation receiver may be for example the photodiodes of a rain-light sensor, which is intended to capture the vehicle's ambient brightness. In order to verify the plausibility of this measurement signal obtained by optical measuring methods, an ambient field of the vehicle is monitored by a capacitive sensor. The electrical capacitance of the ambient air depends on its condition, for example whether it is dry air, clean air that is not charged with aerosols or air charged with dust or moisture particles. A change in the electrical capacitance of the ambient field and the simultaneous capture of response signals from two directions suggests the presence of aerosols in the environment. When of the optical measuring method is used at the same time by means of radiation emitter, radiation receiver and the capacitive measuring method by means of the capacitive sensor, it is possible to verify the plausibility and thus reliably detect the presence of aerosols in the area surrounding the vehicle. For the evaluation, the sensor assembly includes an evaluation device, which may be a calculation unit, for example the on-board computer. The evaluation device may also be used to calculate the probability of occurrence, that is to say the likelihood that mist or other aerosols may form in the air under the current conditions in the area surrounding the vehicle.

In one embodiment of the invention, the evaluation device is designed to output an information signal regarding a possible visual obstruction. If the evaluation of the measurement results by the evaluation device concludes that a visual obstruction may exist, an information signal may be output to the driver, and/or further assistance systems may be engaged correspondingly. In an autonomous vehicle, corresponding systems may be engaged, and for example the travel speed may be adjusted or the lighting controlled. An information signal may be for example an acoustic or optical signal.

In one embodiment of the invention, at least one radiation emitter is at least one of the vehicle's headlamps. For example, a headlamp or also several of the vehicle's headlamps may be used as radiation emitters by actuating the headlamp correspondingly. In particular, the headlamp may be actuated in such manner as to emit a uniquely identifiable detection signal In one embodiment of the invention, the radiation receiver is designed to receive a possible response signal from at least two directions. In this context, the reflection signal is captured from at least two directions. In order to prevent a radiation signal which is only emitted forwards, that is to say in the vehicle's direction of travel, from being reflected by a vehicle travelling ahead, for example, the reflection signal is in particular captured in a path directed straight ahead and in an upwardly directed path. If the radiation signal is only directed forwards, it may be reflected by a vehicle travelling ahead of the motor vehicle. But if a component of the response signal also reaches the radiation receiver from above, this is most probably a reflection from aerosols, since such aerosols completely surround the vehicle and are not only located directly in the direction of travel. The radiation receiver may be a rain-light sensor of the vehicle with a plurality of photodiodes, for example.

BRIEF DESCRIPTION OF THE DRAWINGS

In the following text, the method will be explained in greater details with reference to the exemplary embodiment represented in the drawing. In detail, the schematic drawing shows, in.

DETAILED DESCRIPTION OF THE INVENTION

Figure 1:
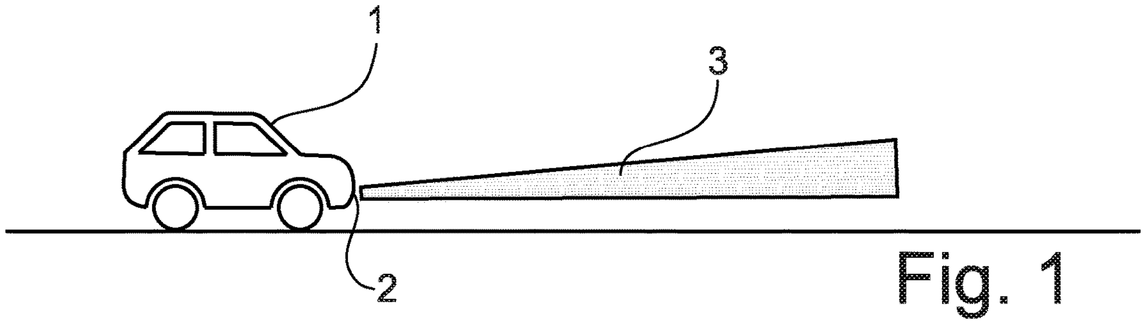
FIG. 1: a vehicle in an aerosol-free environment.

FIG. 1 represents a vehicle 1 with a radiation emitter 2 in the form of a headlamp. A radiation signal 3 is emitted by the radiation emitter 2. Since there is not aerosol or any other object in the area surrounding the vehicle 1, the radiation signal 3 is not reflected or scattered, and consequently no response signal can be received by a radiation receiver 4. The radiation receiver 4 may in particular be the rain-light sensor of the vehicle 1.

Figure 2:
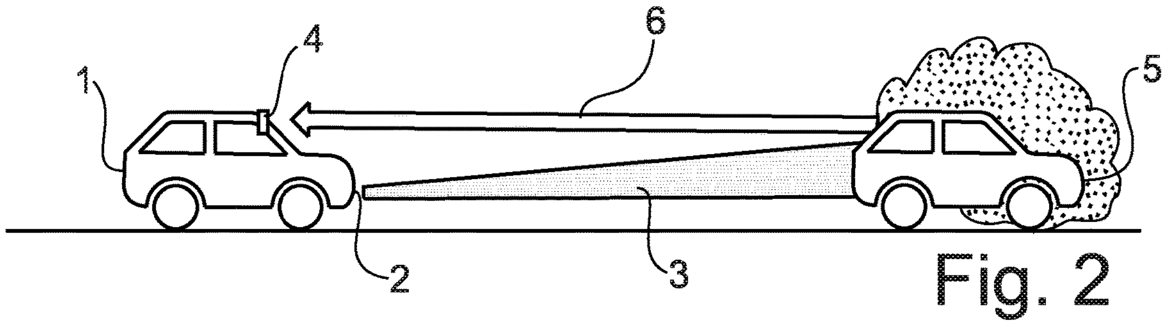
FIG. 2: a vehicle with a vehicle travelling ahead of it.

FIG. 2 illustrates the situation in which another vehicle 5 is travelling ahead of the vehicle 1. The radiation signal 3 emitted by the radiation emitter 2 is reflected by the vehicle 5 and captured by means of the radiation receiver 4. The radiation signal 3 in the form of a light signal is output forwards by the radiation emitter 2 and reflected by the rear of the vehicle 5 travelling ahead. Consequently, the radiation receiver 4 receives a response signal 6 in one direction, specifically coming from directly in front.

Figure 3:
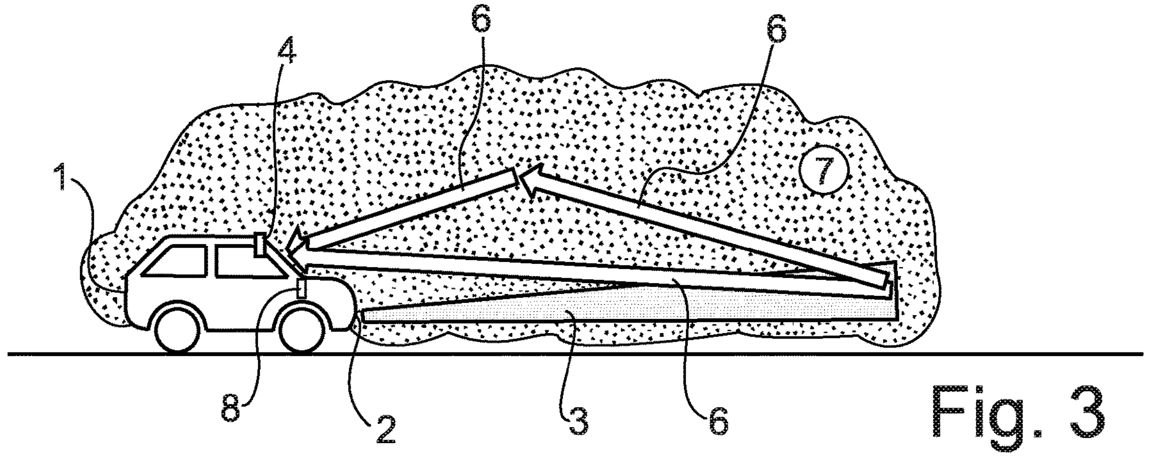
FIG. 3: a vehicle in an aerosol-containing environment.

In FIG. 3 illustrates the situation in which the vehicle 1 is in an environment with aerosol, in particular mist 7. The radiation signal 3 is directed onto the radiation receiver 4 from multiple directions, in particular from directly in front and, due to scattering by the aerosol particles, also from above. The radiation receiver 4 thus captures the radiation from multiple directions, which precludes the possibility that the response signal is only a response signal caused by reflection from another vehicle 5 travelling ahead of the motor vehicle 1.

Figure 4:
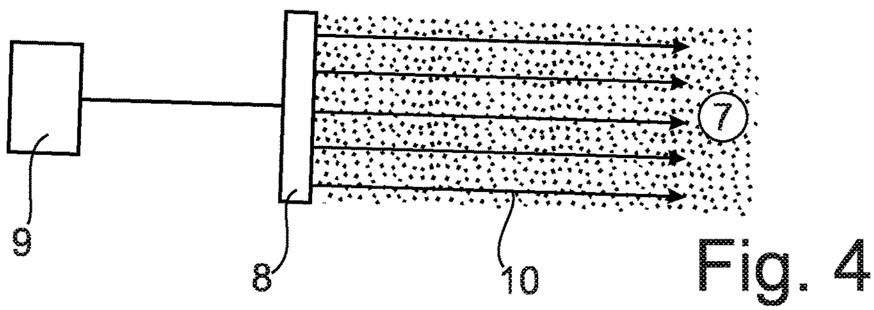
FIG. 4: a capacitive sensor.

FIG. 4 represents a capacitive sensor 8 with an evaluation device 9. An electrical field 10 is generated in the area around the sensor 8 by means of the capacitive sensor 8. The properties of this field change depending on the composition of the air, with the result that in the presence of dry, clean air, for example, the electrical field 10 has a different electrical capacitance than air in which water is dissolved or which contains dust particles. This change is detected by the capacitive sensor 8 and evaluated by means of the evaluation device 9. This in turn makes it possible to verify the plausibility of the by means of the optical measurement system consisting of radiation receiver 4 and radiation emitter 2.

The invention claimed is:

1. A method for detecting aerosols in the ambient air of a motor vehicle comprising:

determining a probability of occurrence of aerosols in the ambient air of the vehicle, sending a control signal to at least one radiation emitter when the probability of occurrence exceeds a defined probability value, emitting a radiation signal by the at least one radiation emitter, detecting a response signal of the emitted radiation signal by at least one radiation receiver, wherein the response signal is detected from at least two directions, detecting an electrical capacitance of an area surrounding the vehicle by at least one capacitive sensor, determining an occurrence of aerosols based upon the response signal and a change in the capacitance in the surrounding area, outputting an information signal regarding a visual obstruction in response to determining the occurrence of aerosols.

2. The method according to claim 1, wherein at least one item of ambient information is included in the determination of the probability of occurrence, and that the at least one item of ambient information is an outside temperature and/or an atmospheric humidity and/or a presence of rain.

3. The method according to claim 1, wherein the emitted radiation signal is a unique detection signal with defined signal characteristics.

4. The method according to claim 1, wherein, after emitting the radiation signal, the response signal is examined by at least one evaluation unit for signal characteristics.

5. The method according to claim 1, wherein an electrical field is generated in the area surrounding the vehicle by the capacitive sensor, and changes in the electrical field are captured.

6. The method according to claim 1, wherein a conclusion is drawn about a condition of the ambient air based on measurement values captured by the at least one capacitive sensor.

7. The method according to claim 1, wherein a conclusion is drawn about a possible visibility limitation in the surrounding area from measurement values captured by the at least one radiation receiver and by the at least one capacitive sensor.

8. The method according to claim 1, wherein the at least one radiation emitter is at least one headlamp of the vehicle.

9. A sensor assembly for detecting aerosols in the ambient air of a motor vehicle, comprising:

at least one radiation emitter for emitting a radiation signal, at least one radiation receiver for capturing a response signal from the emitted radiation signal, wherein the response signal is detected from at least two directions, at least one capacitive sensor for detecting an electrical capacitance of an area surrounding the vehicle, and at least one evaluation device for evaluating the response signal captured by the radiation receiver and the electrical capacitance by the capacitive sensor, wherein the at least one evaluation device is configured to determine an occurrence of aerosols based upon the response signal and a change in the capacitance in the surrounding area, and to output an information signal regarding a visual obstruction in response to determining the occurrence of aerosols.

10. The sensor assembly according to claim 9, wherein the at least one radiation emitter is at least one headlamp of the vehicle.

* * * * *